(12) United States Patent
Shida et al.

(10) Patent No.: US 6,560,184 B2
(45) Date of Patent: May 6, 2003

(54) DISK DEVICE HAVING A DETACHABLE COVER MEMBER

(75) Inventors: Yuji Shida, Tokyo (JP); Shigehisa Miyasaka, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 13 days.

(21) Appl. No.: 09/779,249

(22) Filed: Feb. 8, 2001

(65) Prior Publication Data

US 2001/0015948 A1 Aug. 23, 2001

(30) Foreign Application Priority Data

Feb. 17, 2000 (JP) ........................................ 2000-039610

(51) Int. Cl.[7] ............................................... G11B 33/02
(52) U.S. Cl. ..................................................... 369/75.2
(58) Field of Search ................................ 369/75.1, 75.2, 369/77.1, 77.2

(56) References Cited

U.S. PATENT DOCUMENTS 5,528,566 A * 6/1996 McGee et al. ............... 221/278
5,930,218 A * 7/1999 Mitsui et al. ................ 369/75.1
6,295,265 B1 * 9/2001 Cundiff, Sr. ................. 369/75.2

FOREIGN PATENT DOCUMENTS

| JP | 06251479 | 9/1994 |
| JP | 08017118 | 1/1996 |
| JP | 08-055400 | 2/1996 |
| JP | 08-235715 | 9/1996 |

* cited by examiner

Primary Examiner—George J. Letscher
(74) Attorney, Agent, or Firm—Katten Muchin Zavis Rosenman

(57) ABSTRACT

A disk device is provided with a disk tray having a holding part that holds part of an outer circumference of an optical disk when the disk is inserted into a depression on the disk tray, the disk being held roughly parallel to the surface of the depression. The holding part prevents a disk mounted in a disk tray used in the vertical orientation from tilting with respect to the disk tray, which could interfere with insertion of the disk tray into the disk device.

17 Claims, 6 Drawing Sheets

DISK DEVICE HAVING A DETACHABLE COVER MEMBER

FIELD OF THE INVENTION

This invention concerns a disk device that has a circular depression into which to insert a disk for recording and/or playback and has inside the device main unit a disk tray into which to load said disk.

BACKGROUND OF THE INVENTION

As disk devices such as disk drives for a CD, DVD, etc., disk devices are known in which an optical disk, which is an information recording medium, is loaded by inserting it into a depression in a disk tray that is placed roughly horizontally, and accommodating the disk tray into a device main unit. Sometimes, however, besides being used in the horizontal orientation, the disk tray is used in the vertical orientation.

If the disk device is oriented vertically, it is not possible, just by inserting an optical disk into a disk tray depression, to hold the optical disk on the disk tray. Therefore, as disclosed in Japanese unexamined patent H6-251479 [1994], a disk device has a disk tray in which claws for clamping the optical disk from outside its surface are provided in the outer circumferential part of the depression. In such prior art reference, because the claws hold the optical disk in clamped state, if used in vertical orientation, a condition sometimes results in which the optical disk is tilted with respect to the disk tray, and if this occurs, there is the danger that the optical disk will come into contact with the device main unit during loading into said disk tray. Thus there is the problem that the optical disk must be mounted on the disk tray carefully, so it is not tilted, and the operation of mounting the optical disk becomes complicated.

OBJECTS OF THE INVENTION

It is an object of the present invention, therefore, to provide a disk device whereby the mounting of an optical disk in a disk tray is made easy regardless of the vertical or horizontal orientation of the disk device.

It is a further object of the present invention to provide a disk device having a cover member attached to a disk tray for facilitating the insertion and retention of a disk in the disk tray.

It is a still further object of the present invention to provide a disk device wherein a disk inserted into a depression on a disk tray is guided into a position roughly parallel to the surface of said disk tray depression.

It is a still further object of the present invention to provide a disk device wherein a disk inserted into a depression on a disk tray is prevented from being tilted with respect to said disk tray and thereby interfering with the insertion of said disk tray into said disk device.

Still other objects and advantages of the invention will become clear upon review of the following detailed description in conjunction with the appended drawings.

SUMMARY OF THE INVENTION

A disk device is provided with a disk tray having a holding part that holds part of an outer circumference of an optical disk when the disk is inserted into a depression on the disk tray, the disk being held roughly parallel to the surface of the depression. The holding part prevents a disk mounted in a disk tray used in the vertical orientation from tilting with respect to the disk tray, which could interfere with insertion of the disk tray into the disk device. The holding part is provided along the circumferential edge of the depression and includes a groove-shaped part whose width gradually narrows toward the radially outward side of said depression, thereby resulting in a portion of the outer circumference of the disk being held, making the disk mounting operation even easier.

Also, it is desirable that a cover member that covers part of the disk be attached to the disk tray, and that the groove-shaped part consist of a tapered side surface formed on the outer circumference of the depression base surface and a first disk facing surface of the cover member that is roughly parallel to the depression base surface. Thus, with the cover member covering only part of the disk, a disk can be inserted in the disk tray in the vertical orientation through the part without the cover member. If the disk device is used in the horizontal orientation with the cover member mounted, the inside surface formed on the outer circumference of the depression base surface has a tapered side surface that is inclined toward the radially outward side of the depression, allowing the disk to be taken out smoothly and making the operation of replacing the disk easy. If the cover member is constructed so as to be removable from the disk tray, the cover member can be attached if the disk device is used in vertical orientation and detached if it is used in horizontal orientation.

DETAILED DESCRIPTION OF THE PREFERRED EMBODIMENTS

Figure 1:
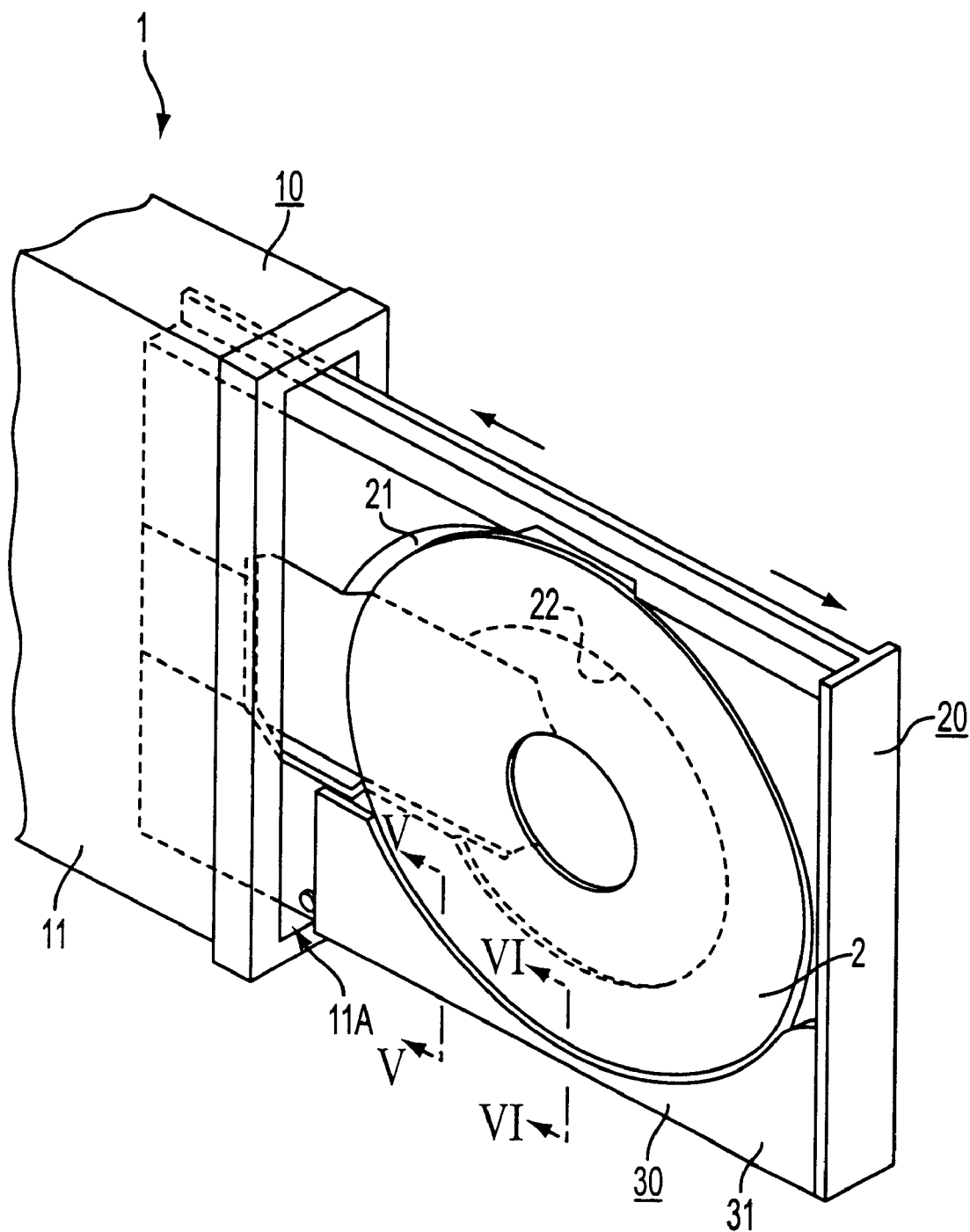
FIG. 1 is a perspective view showing the disk device of the invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 is a perspective view of a disk device 1 of the present invention, which is adapted to play an optical disk 2 such as a CD-ROM, DVD-ROM or the like. The disk device 1 further comprises a main body 10 having an optical pickup unit and a disk tray 20 for accommodating an optical disk 2 and loading into said main body 10. Disk tray 20 has circular depression 21 for accommodating disks having a radius of 12 cm and circular depression 22 for accommodating disks having a radius of 8 cm. A tapered side surface 21B (see also FIGS. 5, 7A–7C) is formed along the outer circumference 21A of depression 21, which tapers in a slanted fashion toward the outer edge of depression 21. Formed approximately in the middle part of disk tray 20 is opening 23, into which the optical pickup unit15 (FIG. 3) is inserted when tray 20 is inserted into device main body 10. Disk tray 20 is preferably a molded plastic product, made of a material of high wear resistance such as POM (polyoxymethylene, polyacetal).

Figure 2:
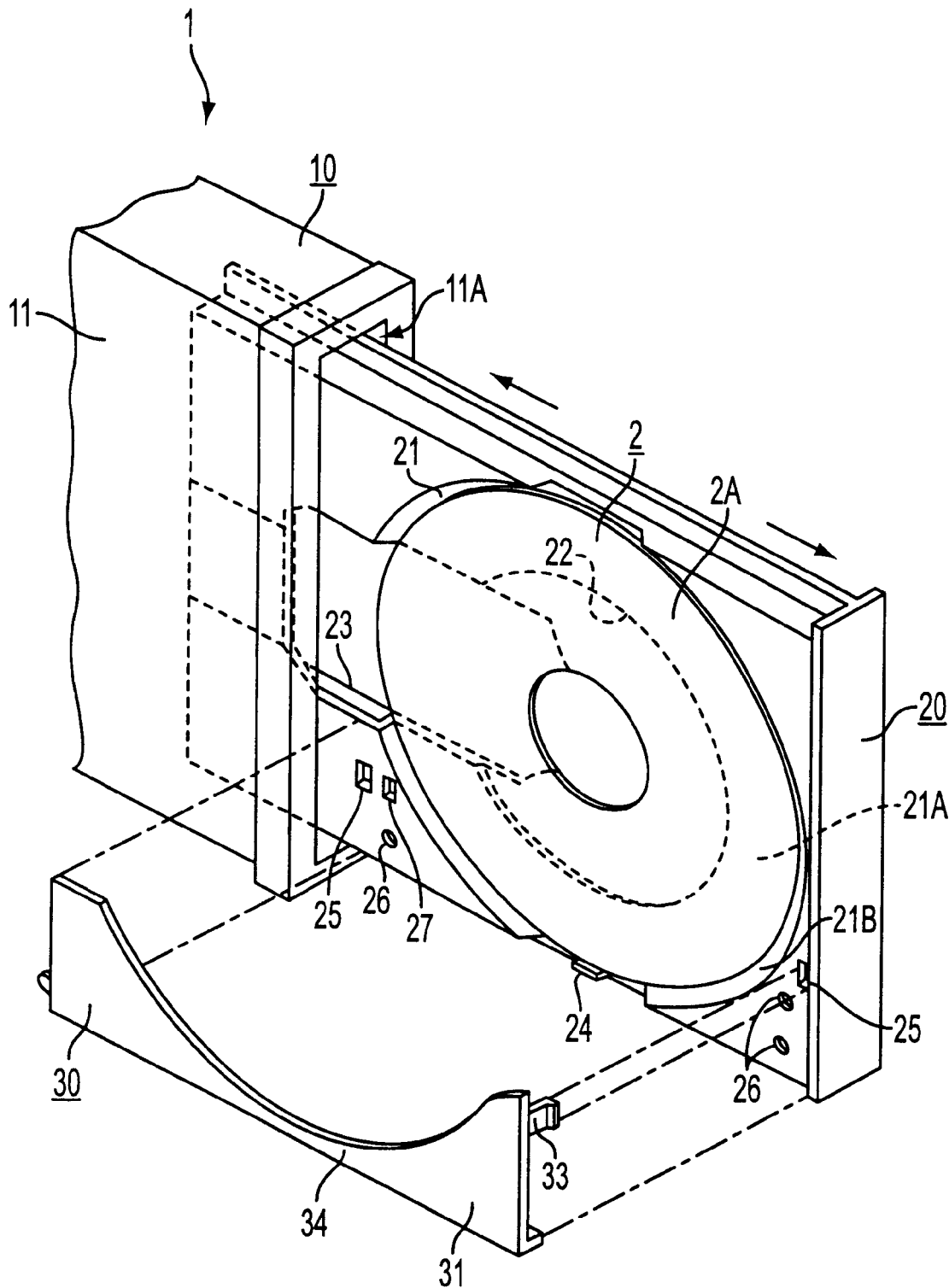
FIG. 2 is an exploded perspective view of the disk device of FIG. 1.

As shown in FIG. 2, disk tray 20 has guide part 24 formed in the middle where a part of the tapered side surface 21B along the lower edge is cut out. Rectangular holes 25, circular holes 26, and elliptical holes 27 are formed on the lower side of disk tray 20 on both sides of depression 21. Cover member 30, which covers part of a disk 2 that is inserted into depression 21, is provided on the lower side of disk tray 20.

Figure 3:
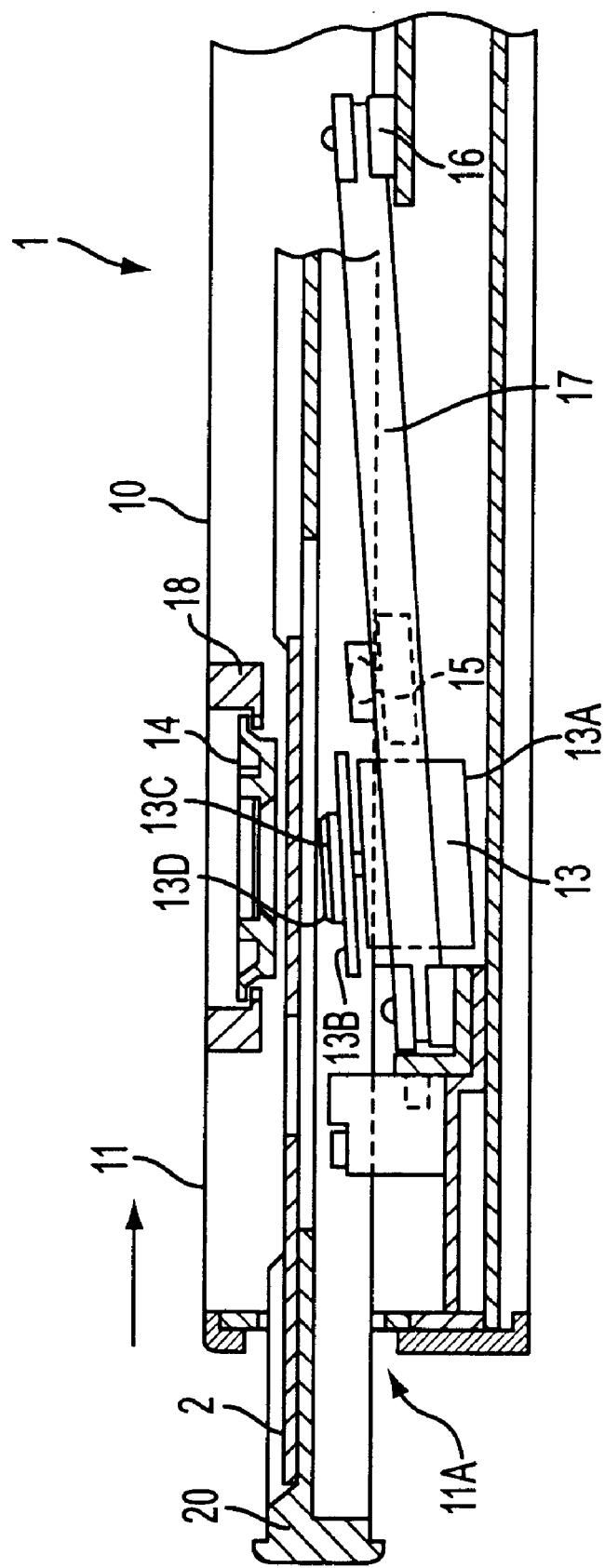
FIG. 3 is a cross-sectional view showing the internal structure of the disk device of the invention.

As shown in FIG. 3, main body 10 has an outer case 11 with an opening 11A for putting in and taking out disk tray 20, spindle motor 13 for rotating optical disk 2, chucking pulley 14, and optical pickup unit 15, which reads information recorded on disk 2. Spindle motor 13 has rotor case 13A, in which the motor main body is housed, disk table 13B, which supports optical disk 2 and is provided on a rotation shaft that protrudes from rotor case 13A, insertion part 13C provided on the upper surface of disk table 13B, which is inserted into the center hole of optical disk 2, and slanting guide 13D formed on the upper part of insertion part 13C. Spindle motor 13 and optical pickup unit 15 are positioned on base member 17, which is rotatably supported by rotation fulcrum 16 in the back of device main body 10. Together with the rotation of base member 17, spindle motor 13 and optical pickup unit 15 move so as to approach toward and retreat from disk tray 20. Chucking pulley 14, which holds disk tray 20 in between, is provided on the opposite side of spindle motor 13 and optical pickup unit 15 and is held freely rotatably by pulley holder 18, which is formed on the inside surface of outer case 11. Inside device main body 10 is a drive mechanism (not shown) that causes base member 17 to rotate about rotation fulcrum 16 as disk tray 20 is put in and taken out through opening 11A.

Figure 4:
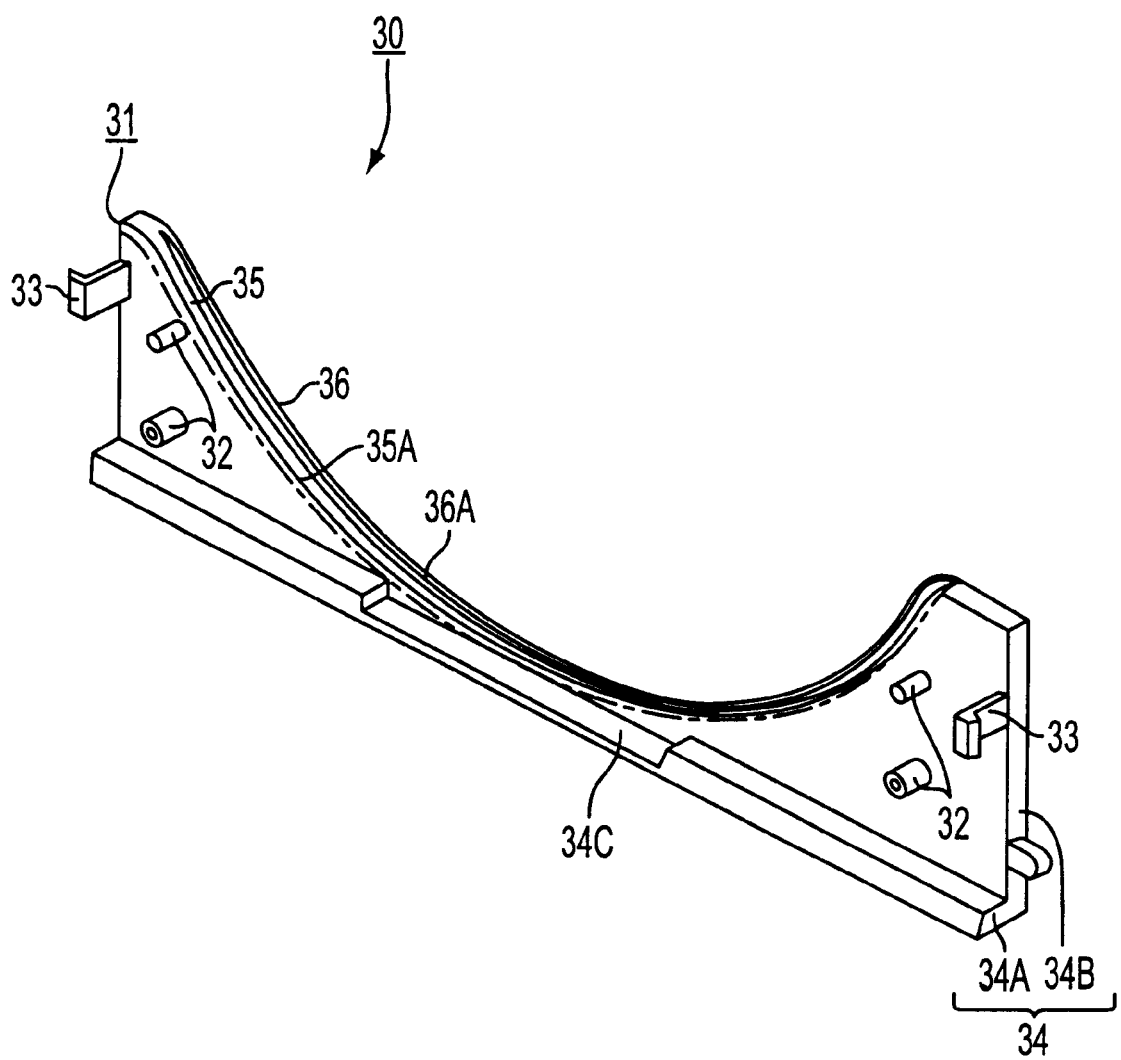
FIG. 4 is a perspective view showing the cover member of the invention.
Figure 5:
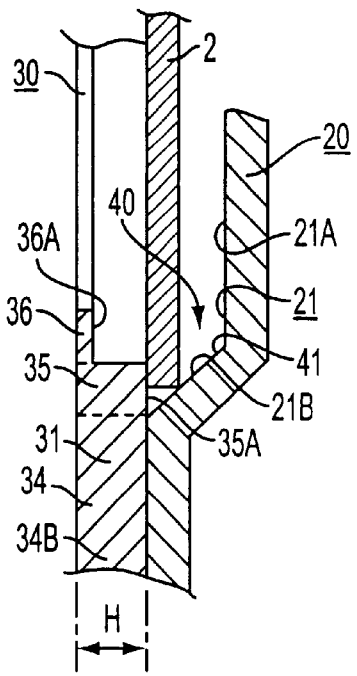
FIG. 5 is a cross sectional view along line V—V in FIG. 1.
Figure 6:
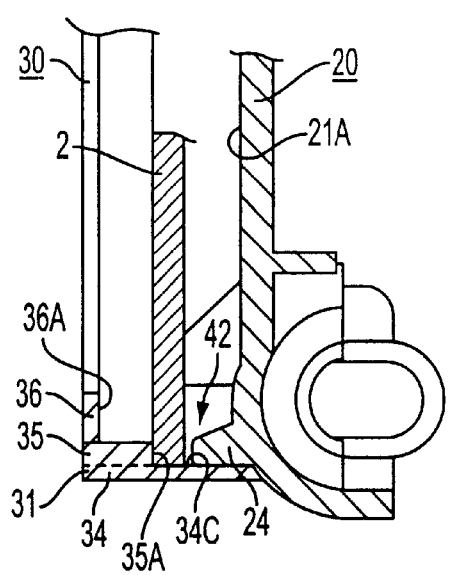
FIG. 6 is a cross sectional view along line VI—VI in FIG. 1.

As shown in FIGS. 4–6, cover member 30 has main body 31, cylindrical insertion parts 32 engageable in holes 26, 27 in tray 20, and J-shaped engagement parts 33 engageable in holes 25 in tray 20, which engagement parts 32, 33 are preferably integrally formed on main body 31. Main body 31 further comprises cover part 34, which is roughly L-shaped in cross-section and covers the perimeter of depression 21 along the outer circumference of depression 21 when attached to disk tray 20 (see FIG. 1). Cover part 34 has a horizontal component 34A, which engages with the end of disk tray 20, and a vertical component 34B, which covers the perimeter of depression 21 along the outer circumference thereof. Insertion parts 32 and engagement parts 33 are provided in the surface of facing sides in disk tray 20 of vertical component 34B of cover part 34. By inserting and engaging insertion parts 32 and engagement parts 33 in holes 25–27 of disk tray 20, such a cover member 30 is attached to said disk tray 20 and made integral with it. The projection dimension H (FIG. 5) from the surface of disk tray 20 to the surface of cover part 34 when cover member 30 is attached to disk tray 20 is dimensioned so that cover member 30 never comes into contact with device main body 10 when disk tray 20 is inserted into device main body 10.

Cover member 30 further comprises notch part 34C, which is cut out to match the cut-out of depression 21, and is formed in the middle of horizontal component 34A of cover part 34 and is adapted to accommodate guide part 24 formed in disk tray 20. Projection part 35, which protrudes inward from cover part 34 along the radius of depression 21, is formed in an arc shape along the outer circumference of depression 21. The surface of projection part 35 that faces base surface 21A of depression 21 defines a first disk facing surface 35A that faces optical disk 2 when inserted into depression 21. This first disk facing surface 35A is a surface that is roughly parallel to base surface 21A of depression 21. Projection piece 36 protrudes inward along the radius of depression 21 at the end on the radially inward side of projection part 35. Projection piece 36 extends from the surface exposed to the outside of projection part 35 continuously toward the radially inward side of depression 21 and is formed in the shape of a thin plate that is smaller than the thickness dimension of projection part 35. The surface of projection piece 36 on the side that faces base surface 21A of depression 21 defines a second disk facing surface 36A that faces an optical disk 2 when inserted into depression 21. This second disk facing surface 36A is a surface that is roughly parallel to base surface 21A of depression 21. In other words, a ledge is provided between projection part 35 and projection piece 36, and between first disk facing surface 35A and second disk facing surface 36A.

As shown in FIG. 5, holding part 40 that holds part of the outer circumference of optical disk 2 is formed on disk tray 20 to which such cover member 30 is attached in such a way that when optical disk 2 is inserted into depression 21, said optical disk 2 becomes roughly parallel to base surface 21A of depression 21. Specifically, holding part 40 is provided along the circumferential edge of depression 21 and is constructed with a groove-shaped part 41 whose width gradually narrows toward the radially outward side of said depression 21. Groove-shaped part 41 is formed with a groove-shaped cross-section by tapered side surface 21B and first disk facing surface 35A of projection part 35 of cover member 30. Optical disk 2 that is inserted into groove-shaped part 41 makes contact by the middle part of tapered side surface 21B, and thereby optical disk 2 is held roughly parallel to depression base surface 21A. Here, the contact position of optical disk 2 on tapered side surface 21B may be such that when optical disk 2 is inserted into device main body 10, the center hole of optical disk 2 comes into contact with guide surface 13D (FIG. 3). In this way, when disk insertion part 13C and chucking pulley 14 engage, optical disk 2 is guided to guide surface 13D, and the center of rotation of disk insertion part 13C and the center of optical disk 2 are aligned.

As shown in FIG. 6, a gap 42 for placement of optical disk 2 is defined along notch part 34C on cover member 30 between the first disk facing surface 35A and guide part 24. The upper surface of guide part 24 tapers toward cover member 30 and eventually contacts notch part 34C as shown. Therefore, when disk device 1 is used in the vertical orientation and when an optical disk 2 is inserted into depression 21 of disk tray 20, part of the outer circumference of said optical disk 2 is guided along guide part 24 and gets sandwiched between first disk facing surface 35A and taper side surface 21B, and is positioned securely in gap 42 and roughly parallel to first disk facing surface 35A. Thus, outer surface 2A of optical disk 2 (see FIG. 2) that faces first disk facing surface 35A comes into contact with said first disk facing surface 35A, and optical disk 2 is automatically positioned roughly parallel to depression base surface 21A (FIG. 6).

Figure 7A:
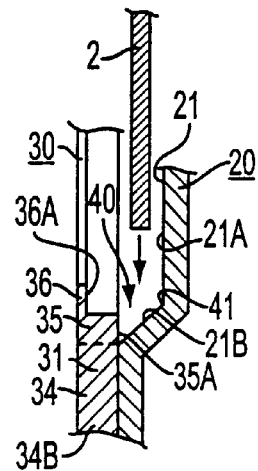
FIGS. 7A through 7C show the procedure for mounting an optical disk in the disk device of the invention.
Figure 7B:
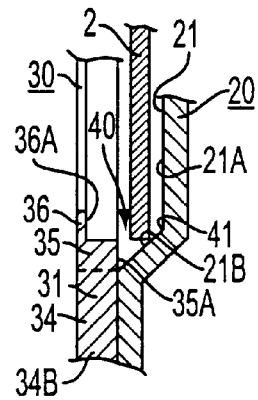
Figure 7C:
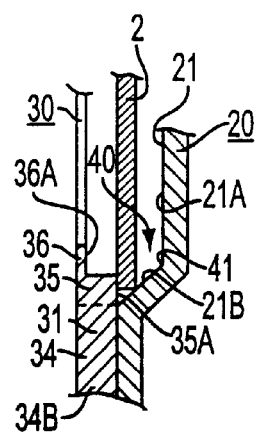

Mounting an optical disk 2 in a disk device 1 is fairly straightforward. First, if disk device 1 is used in the vertical orientation in which disk tray 20 is vertical, cover member 30 is left attached to disk tray 20. Then optical disk 2 is inserted so as to drop in between cover member 30 and disk tray 20, as shown in FIG. 7A. Then, as shown in FIGS. 7B and 7C, optical disk 2 slides along tapered side surface 21B and the top surface of the guide part (see FIG. 6) and is automatically guided and sandwiched in between tapered side surface 21B and first disk facing surface 35A, and surface 2A of disk 2 comes into contact with first disk facing surface 35A. Thus there is no need to mount disk 2 in disk tray 20 carefully so that disk 2 is not tilted. Also, because first disk facing surface 35A is roughly parallel to depression base surface 21A, the tilt of optical disk 2 when inserted is restricted by first disk facing surface 35A, and it can automatically be positioned roughly parallel to depression base surface 21A. Furthermore, because holding part 40 is composed with groove-shaped part 41, just by inserting optical disk 2 into groove-shaped part 41, a state results in which part of the outer circumference of optical disk 2 is held sandwiched in groove-shaped part 41, with no other operation during the insertion of optical disk 2, making the operation of inserting optical disk 2 even easier (see FIGS. 7B and 7C).

Thereafter, when disk tray 20, on which optical disk 2 is mounted, is inserted into device main body 10, said optical disk 2 can be supported by second disk facing surface 36A even if, for example, disk device 1 experiences a vibration and optical disk 2, unable to be held by holding part 40, slips off. Thus, the provision of first disk facing surface 35A and second disk facing surface 36A assures that even if optical disk 2 cannot be held by holding part 40 and slips off due to the orientation of disk device 1 or vibration that disk device 1 is subjected to, it can be supported by second disk facing surface 36A, and optical disk 2 can be kept from falling off.

If disk device 1 is used in the horizontal orientation, cover member 30 covers only part of optical disk 2, so optical disk 2 can be inserted into depression 21 from the part where cover member 30 is not present.

In addition, this invention is not limited to the aforesaid embodiment but includes other compositions that can accomplish the purpose of this invention, and variations such as the following are included in this invention.

For example, a disk device may be provided with a guide part having a different configuration than shown in the aforesaid embodiment, as long as the guide part functions to guide the insertion and retention of a disk in a disk tray. Also, the first and second disk facing surfaces 35A, 36A may be appropriately constructed without being laterally and/or vertically offset as shown. In addition, the groove-shaped part does not have to be limited to a tapered side surface 21B formed in a tapered shape and a first disk facing surface 35A, but can be provided with a different construction having along a circumferential edge of the depression a gradual narrowing toward the radial outward side of said depression. In this regard, the tilt of the tapered side surface may be outwardly or inwardly directed as the case may be.

In the embodiment discussed above, the cover member is effectively integral with the disk tray. However, the cover member may also be detachable or removable from disk tray 20 by releasing the engagement between engagement parts 33 and holes 25. Thus, if disk device 1 is used in the vertical orientation and removed if it is used in horizontal orientation, the operation of mounting optical disk 2 on disk tray 20 can be made easy regardless of the orientation of disk device 1.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

We claim:

1. A disk device comprising:

a) a main body;

b) a disk tray loadable into said main body and having a depression into which a disk, having an outer circumference, is placed; said depression having base surface, and c) a holding part provided on said disk tray that guides the insertion and placement of a disk into a position that is substantially parallel to said depression d) wherein said depression further comprises a circumferential edge and said holding pan further comprises a groove shaped part having a width that gradually narrows toward a radial outward side of said depression, and e) wherein said cover member is removably attachable to said disk tray such that said cover member is attached to said disk tray while said disk device is used in a vertical orientation, and such that said cover member is removed from said disk tray while said disk device is used in a horizontal orientation.

2. A disk device in accordance with claim 1, wherein said cover member further comprises a first disk facing surface that is substantially parallel to said depression base surface.

3. A disk device in accordance with claim 2, wherein said cover member further comprises a projection piece that projects inward along a radius of a tip of said first disk facing surface.

4. A disk device in accordance with claim 2, further comprising a second disk facing surface laterally spaced from said first disk facing surface and defining a horizontal ledge between said first and second disk facing surfaces.

5. A disk device in accordance with claim 1, wherein said cover member further comprises a horizontal component and a vertical component and a notch pan disposed in the center of said horizontal component.

6. A disk device in accordance with claim 5, wherein said disk tray further comprises a guide part that rests on said notch part when said cover member is attached to said disk tray.

7. A disk device comprising:

a) a main body;

b) a disk tray loadable into said maw body and having a depression into which a disk, having an outer circumference, is placed; said depression having base surface, and c) a holding part provided on said disk tray that guides the insertion and placement of a disk into a position that is substantially parallel to said depression d) wherein said depression comprises a circumferential edge and said holding part further comprises a groove shaped part having a width that gradually narrows toward a radial outward side of said depression, and e) wherein said cover member comprises engagement parts that are engageable with engagement holes formed in said disk tray.

8. A disk tray for use with a disk device, said disk tray comprising:

a) a depression having a tapered peripheral edge into which a disk having an external circumference is placed,
b) a tapered guide part disposed along a peripheral edge of said depression, and
c) a cover member removably attachable to said disk tray such that said cover member is attached to said disk tray while said disk device is used in a vertical orientation, and such that said cover member is removed from said disk tray while said disk device is used in a horizontal orientation, said cover member having a first disk facing surface,
d) wherein said tapped guide part guides a disk inserted into said disk tray into a position that is substantially parallel to said depression and between said tapered guide part and said first disk facing surface.

9. A disk tray in accordance with claim 8, wherein said cover member is dimensioned to cover part of an inserted disk when said cover member is attached to said disk tray.

10. A disk tray in accordance with claim 8, wherein said depression further comprises a circumferential edge and a holding part further comprising a groove shaped part having a width that gradually narrows toward a radial outward side of said depression.

11. A disk tray in accordance with claim 8, wherein said cover member further comprises a second disk facing surface laterally spaced from said first disk facing surface and defining a horizontal ledge between said first and second disk facing surfaces.

12. A disk tray in accordance with claim 8, wherein said cover member further comprises a horizontal component and a vertical component and a notch part disposed in the center of said horizontal component.

13. A disk tray in accordance with claim 8, wherein said disk tray further comprises a guide part that rests on said notch part when said cover member is attached to said disk tray.

14. A disk tray for use with a disk device, said disk tray comprising:
a) a depression having a tapered peripheral edge into which a disk having an external circumference is placed,
b) a tapered guide part disposed along a peripheral edge of said depression, and
c) a cover member removably attachable to said disk tray and having a first disk facing surface,
d) wherein said tapered guide part guides a disk inserted into said disk tray into a position that is substantially parallel to said depression and between said tapered guide part and said first disk facing surface, and
e) wherein said cover member further comprises engagement parts that are engageable with engagement holes formed in said disk tray.

15. A disk tray in accordance with claim 14, wherein said engagement parts are formed integrally with said cover member.

16. A disk tray for use with a disk device, said disk tray comprising:
a) a depression into which a disk having an external circumference is placed, said depression having a tapered outer peripheral edge, and
b) a cover member removably attachable to said disk tray such that said cover member is attached to said disk tray while said disk device is used in a vertical orientation, and such that said cover member is removed from said disk tray while said disk device is used in a horizontal orientation, said cover member having a disk facing surface,
d) wherein said tapered outer peripheral edge guides a disk inserted into said disk tray into a position that is substantially parallel to said depression, and
e) wherein said tapered outer peripheral edge is positioned relative to said disk facing surface such that the external circumference of a disk inserted into said depression is seated on said tapered outer peripheral edge and said disk is sandwiched between said tapered outer peripheral edge and said disk facing surface, thereby enabling a disk having varying thicknesses to be mounted on said disk tray.

17. A disk tray in accordance with claim 16, wherein said disk facing surface extends parallel to said depression and over a junction between said outer peripheral edge and said cover member when said cover member is attached to said disk tray such that disk facing space provides a guide for maintaining an inserted disk in the upright position when said disk tray is used in the vertical orientation.

* * * * *